(12) United States Patent
Ahn et al.

(10) Patent No.: US 10,716,149 B2
(45) Date of Patent: Jul. 14, 2020

(54) METHOD AND APPARATUS FOR PERFORMING RANDOM ACCESS PROCEDURE

(71) Applicant: LG ELECTRONICS INC., Seoul (KR)

(72) Inventors: Joonkui Ahn, Seoul (KR); Kijun Kim, Seoul (KR); Byounghoon Kim, Seoul (KR); Suckchel Yang, Seoul (KR); Hanjun Park, Seoul (KR); Yunjung Yi, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 16/073,449

(22) PCT Filed: Jan. 26, 2017

(86) PCT No.: PCT/KR2017/000935
§ 371 (c)(1),
(2) Date: Jul. 27, 2018

(87) PCT Pub. No.: WO2017/131458
PCT Pub. Date: Aug. 3, 2017

(65) Prior Publication Data
US 2019/0037607 A1 Jan. 31, 2019

Related U.S. Application Data (60) Provisional application No. 62/288,448, filed on Jan. 29, 2016, provisional application No. 62/294,304, (Continued)

(51) Int. Cl.
*H04W 74/08* (2009.01)
*H04W 16/14* (2009.01)
(Continued)

(52) U.S. Cl.
CPC ........ *H04W 74/0833* (2013.01); *H04W 16/14* (2013.01); *H04W 74/0816* (2013.01)

(58) Field of Classification Search
CPC ............. H04W 74/0816; H04W 16/14; H04W 74/0833; H04W 28/04; H04W 72/0413;
(Continued)

(56) References Cited

U.S. PATENT DOCUMENTS 9,007,960 B2 * 4/2015 Narasimha ........ H04W 74/0841
370/254
9,198,200 B2 * 11/2015 Narasimha ........ H04W 74/0841
(Continued)

FOREIGN PATENT DOCUMENTS

WO WO 2015/056924 A1 4/2015
WO WO 2015/146638 A1 10/2015
(Continued)

OTHER PUBLICATIONS

Huawei et al., "Analysis of the Impact of Discontinuous Transmission on User Plane in LAA", R2-150244, 3GPP TSG-RAN WG2 Meeting #89, Athens, Greece, Feb. 9-13, 2015, 4 pages.
(Continued)

*Primary Examiner* — Man U Phan
(74) *Attorney, Agent, or Firm* — Birch, Stewart, Kolasch & Birch, LLP (57) ABSTRACT

Provided are a method of performing a random access procedure in an unlicensed band and a device using the method. The device performs a clear channel assessment (CCA) during a random access preamble (RAP) window in the unlicensed band. If the CCA succeeds, the wireless device transmits a plurality of RAPs. The plurality of RAPs are repeatedly transmitted in a frequency domain or a time domain.

12 Claims, 9 Drawing Sheets

Related U.S. Application Data filed on Feb. 12, 2016, provisional application No. 62/313,817, filed on Mar. 28, 2016, provisional application No. 62/319,287, filed on Apr. 6, 2016, provisional application No. 62/334,389, filed on May 10, 2016, provisional application No. 62/339,103, filed on May 20, 2016.

(58) Field of Classification Search
CPC . H04W 52/0209; H04W 74/08; H04W 72/04; H04L 1/1854; H04L 1/1861; H04L 5/0032; H04L 5/0055; H04L 5/0082; H04L 5/0094; H04L 1/1893; H04L 5/14; H04L 5/001; Y02D 70/142; Y02D 70/1264; Y02D 70/23; Y02D 70/146; Y02D 70/00; Y02D 70/1262; Y02D 70/1222; Y02D 70/1242; Y02D 70/25; Y02D 70/1224
USPC .......................................................... 370/329
See application file for complete search history.

(56) References Cited

U.S. PATENT DOCUMENTS

| | | | | |
|---|---|---|---|---|
| 9,363,829 | B2* | 6/2016 | Di Girolamo | H04W 16/14 |
| 9,596,660 | B2* | 3/2017 | Park | H04W 4/70 |
| 9,717,071 | B2* | 7/2017 | Chen | H04W 72/1215 |
| 9,743,363 | B2* | 8/2017 | Dabeer | H04W 52/246 |
| 9,894,686 | B2* | 2/2018 | Di Girolamo | H04W 74/0808 |
| 10,075,981 | B2* | 9/2018 | Yasukawa | H04W 28/08 |
| 10,201,013 | B2* | 2/2019 | Di Girolamo | H04W 72/0446 |
| 10,375,739 | B2* | 8/2019 | Einhaus | H04L 5/0082 |
| 10,390,367 | B2* | 8/2019 | Di Girolamo | H04W 74/0808 |
| 2013/0083747 | A1 | 4/2013 | Narasimha et al. | |
| 2015/0049712 | A1 | 2/2015 | Chen et al. | |
| 2015/0057011 | A1 | 2/2015 | Di Girolamo et al. | |
| 2015/0373652 | A1 | 12/2015 | Dabeer et al. | |

FOREIGN PATENT DOCUMENTS

| | | |
|---|---|---|
| WO | WO 2017/027059 A1 | 2/2017 |
| WO | WO 2017/031725 A1 | 3/2017 |

OTHER PUBLICATIONS

Huawei et al., "UL transmission design for LAA", R1-153228, 3GPP TSG RAN WG1 Meeting #81, Fukuoka, Japan, May 25-29, 2015, 6 pages.

Samsung, "Discussion on UL transmission for LAA", R1-150368, 3GPP TSG RAN WG1 #80, Athens, Greece, Feb. 9-13, 2015, 7 pages.

Sadek et al., "Extending LTE to unlicensed band—Merit and coexistence", 2015 IEEE International Conference on Communication Workshop (ICCW), Jun. 8-12, 2015, pp. 2344-2349.

Attached is the Extended European Search Report, dated Jul. 8, 2019, for European Application No. 17744579.8.

* cited by examiner

METHOD AND APPARATUS FOR PERFORMING RANDOM ACCESS PROCEDURE

CROSS-REFERENCE TO RELATED APPLICATIONS

This application is the National Phase of PCT International Application No. PCT/KR2017/000935, filed on Jan. 26, 2017, which claims priority under 35 U.S.C. 119(e) to U.S. Provisional Application No. 62/288,448 filed on Jan. 29, 2016, U.S. Provisional Application No. 62/294,304 filed on Feb. 12, 2016, U.S. Provisional Application No. 62/313,817 filed on Mar. 28, 2016, U.S. Provisional Application No. 62/319,278 filed on Apr. 6, 2016, U.S. Provisional Application No. 62/334,389 filed on May 10, 2016, and to U.S. Provisional Application No. 62/339,103 filed on May 20, 2016, all of which are hereby expressly incorporated by reference into the present application.

BACKGROUND OF THE INVENTION

Field of the Invention

The present invention relates to wireless communication, and more particularly, to a method of performing a random access procedure, and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

A random access procedure is used by a user equipment (UE) to obtain uplink (UL) synchronization with a base station (BS) or to allocate UL radio resources. In general, the random access procedure is performed in a licensed band, and operates by using a predetermined radio resource at predetermined timing. However, there is a need to design the random access procedure to be performed in a band in which various protocols exist.

SUMMARY OF THE INVENTION

The present invention provides a method of performing a random access procedure, and a device using the method.

In an aspect, a method for performing a random access procedure in an unlicensed band is provided. The method includes performing, by a wireless device, a clear channel assessment (CCA) during a random access preamble (RAP) window in the unlicensed band, and transmitting, by the wireless device, a plurality of RAPs if the CCA is successful. The plurality of RAPs are repeatedly transmitted in a frequency domain or a time domain.

In another aspect, a device for performing a random access procedure in an unlicensed band includes a transceiver configured to transmit and receive a radio signal, and a processor operatively coupled to the transceiver. The processor is configured to control the transceiver to perform a clear channel assessment (CCA) during a random access preamble (RAP) window in the unlicensed band, and control the transceiver to transmit a plurality of RAPs if the CCA is successful. The plurality of RAPs are repeatedly transmitted in a frequency domain or a time domain.

A random access procedure for uplink transmission may be performed in a band in which various protocols exist.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
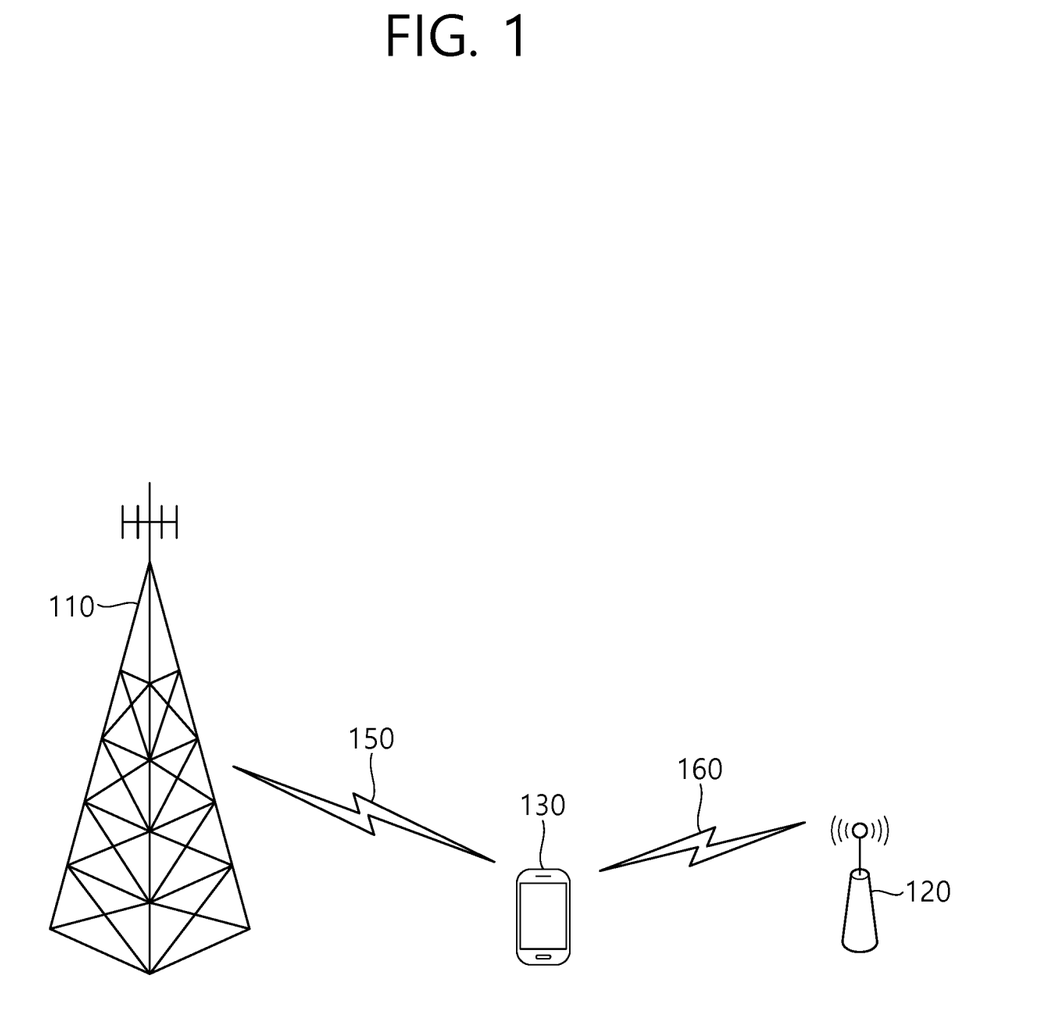
FIG. 1 shows an example of an LTE service using an unlicensed band.

FIG. 1 shows an example of an LTE service using an unlicensed band.

A wireless device 130 establishes a connection with a 1st BS 110, and receives a service through a licensed band. For traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Hereinafter, a cell (or a carrier) operating in an unlicensed band is called an unlicensed cell. A cell operating in a licensed band is called a licensed cell. For clarity, it is assumed that the licensed cell is a primary cell and the unlicensed cell is a secondary cell.

Hereinafter, a radio frame includes 10 subframes. One subframe may include a plurality of orthogonal frequency division multiplexing (OFDM) symbols in a time domain. A time required to transmit one subframe is defined as a transmission time interval (TTI). For example, 1 TTI may be 1 millisecond (ms). The OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 2:
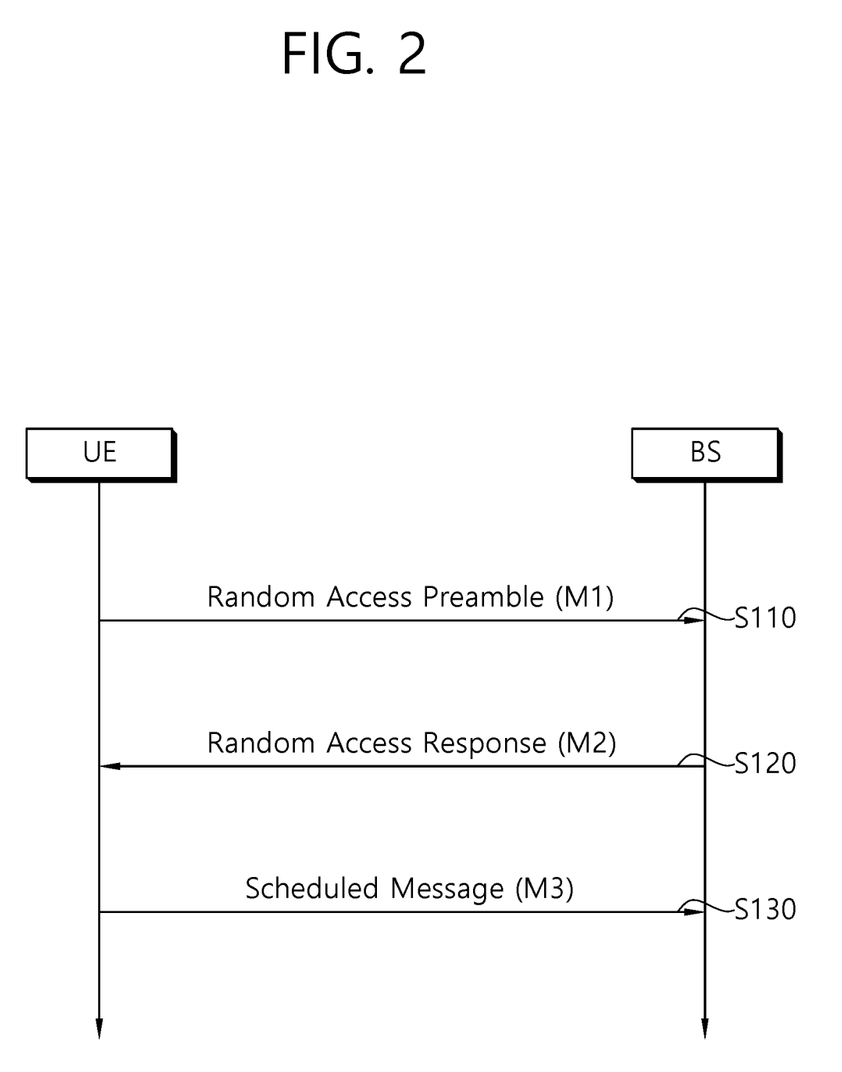
FIG. 2 is a flowchart showing an example of a random access procedure to which the present invention is applied.

FIG. 2 is a flowchart showing an example of a random access procedure to which the present invention is applied. The random access procedure is used by a wireless device for UL synchronization acquisition with a BS or UL radio resource allocation.

A UE receives a root index and a physical random access channel (PRACH) configuration index from the BS. Each cell has 64 candidate random access preambles defined by a Zadoff-Chu (ZC) sequence. The root index is a logical index for generating the 64 candidate random access preambles by the UE.

Transmission of the random access preamble is limited by specific time and frequency resources in each cell. A PRACH configuration index indicates a specific subframe, in which the random access preamble can be transmitted, and a preamble format.

The UE transmits a randomly selected random access preamble to the BS (S110). The UE selects one of the 64 candidate random access preambles. In addition, a corresponding subframe is selected by the PRACH configuration index. The UE transmits the selected random access preamble to the selected subframe.

Upon receiving the random access preamble, the BS transmits a random access response (RAR) to the UE (S120). The RAR is detected in two steps. First, the UE detects a PDCCH masked with a random access-RNTI (RA-RNTI). In addition, the UE receives the RAR included in a medium access control (MAC) protocol data unit (PDU) on a physical downlink shared channel (PDSCH) indicated by a DL gran on the detected PDCCH.

The RAR may include a timing advance command (TAC), a UL grant, and a temporary C-RNTI. The TAC is information indicating a time alignment value sent by the BS to the UE to maintain a UL time alignment. The UE updates UL transmission timing by using the time alignment value. When the UE updates the time alignment, a time alignment timer starts or restarts. The UE can perform UL transmission only when the time alignment timer is running.

The UE transmits a scheduled message to the BS according to a UL grant included in the RAR (S130).

Figure 3:
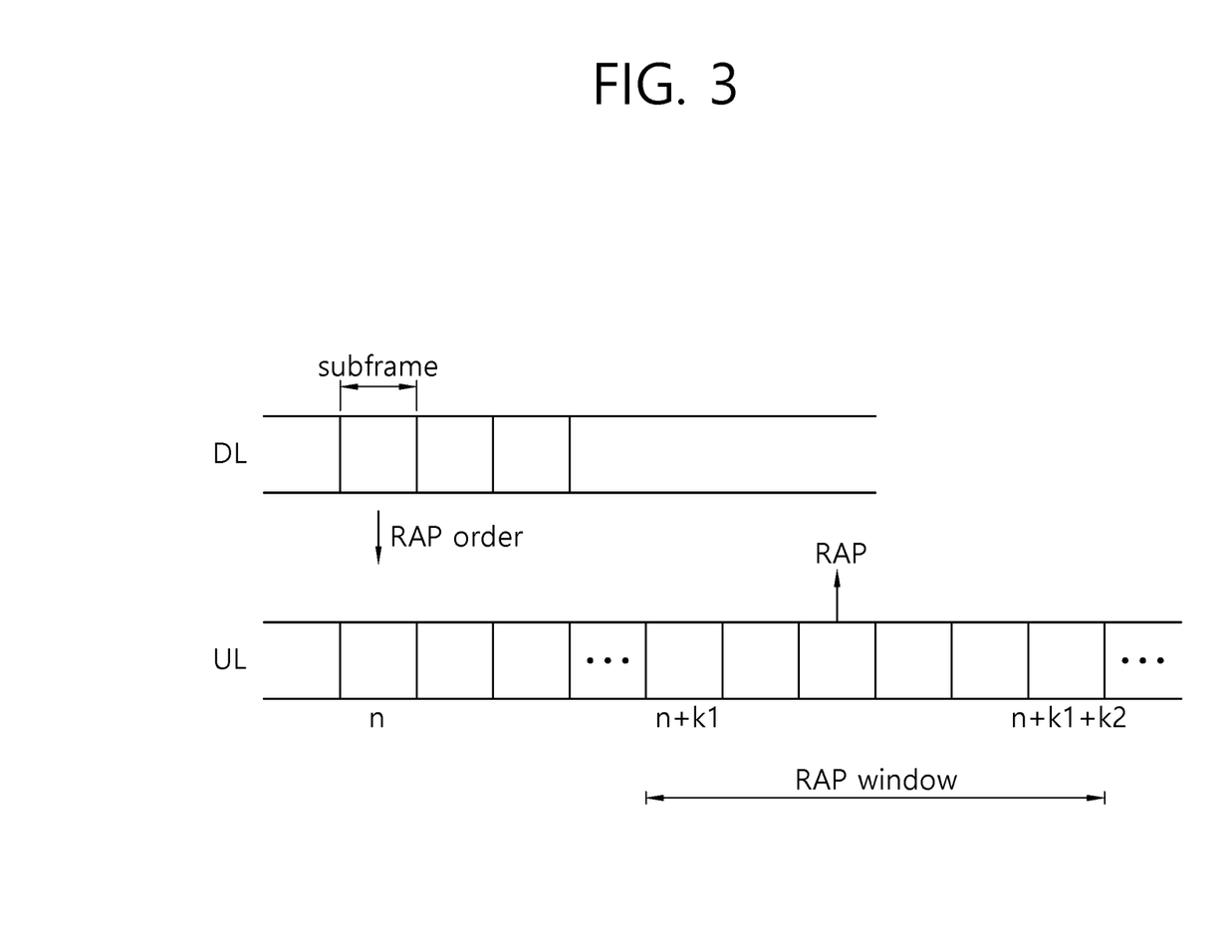
FIG. 3 shows another example of a random access procedure to which the present invention is applied.

FIG. 3 shows another example of a random access procedure to which the present invention is applied.

A BS transmits to a UE a RAP order for instructing RAP transmission in an unlicensed cell. The RAP order may be instructed by downlink control information (DCI) transmitted through a DL control channel (e.g., a PDCCH or an EPDCCH).

The UE transmits a RAP in a RAP window. The RAP window may include consecutive subframes in which the RAP will be transmitted. For example, if the RAP order is received in a subframe n, a subframe n+k1 to a subframe n+k1+k2 may correspond to the RAP window. 'k1' may be a start time of the RAP window, and 'k2' may be a length of the RAP window.

3GPP LTE provides the following four types of RAP formats to transmit a RAP in various environments.

TABLE 1

| Preamble format | T_CP | T_SEQ |
| --- | --- | --- |
| 0 | 3168 * Ts | 24576 * Ts |
| 1 | 21024 * Ts | 24576 * Ts |
| 2 | 6240 * Ts | 2 * 24576 * Ts |
| 3 | 21024 * Ts | 2 * 24576 * Ts |
| 4 | 448 * Ts | 4096 * Ts |

Ts is a basic time unit, and is defined as Ts=1/(15000*2048). T_CP is a cyclic prefix (CP) length of the RAP, and T_SEQ is a length of the RAP.

A transmission bandwidth of the RAP is fixed to about 1 MHz. The RAP is generated based on a Zadoff-Chu (ZC) sequence while maintaining a constant size in both a frequency domain and a time domain. For example, the RAP format 0 has a subcarrier spacing of 1.25 kHz, and the RAP format 4 has a subcarrier spacing of 7.5 kHz.

In an environment where various protocols coexist as in an unlicensed band, the transmission bandwidth of the RAP needs to be adjusted more flexibly. For example, assume that an operating bandwidth of the unlicensed band is 10 MHz. If the RAP is transmitted only at a bandwidth of 1 MHz, channel access may be attempted by recognizing that other communication nodes are in a CCA idle state in the remaining bands of 9 MHz.

Accordingly, the RAP may need to be transmitted while occupying at least a minimum value of the operating bandwidth. The minimum value may be any one value in the range of 70% to 100%.

In addition, the unlicensed band has a limitation in maximum power spectral density (PSD) that can be transmitted by each communication node according to a region. Signal power may have to be evenly distributed to a sufficiently great bandwidth so that signal transmission of each communication node satisfies necessary coverage while keeping the limitation for the PSD.

Hereinafter, a RAP structure capable of supporting a wider bandwidth on the basis of a RAP format of the conventional 3GPP LTE is proposed. Although RAP transmission in an unlicensed band is described for example, the present invention is not limited thereto.

If a basic carrier spacing of a 3GPP LTE system is delta_SC, then delta_SC=15 kHz. It is defined that a useful OFDM symbol duration of the proposed RAP is T_prach, and T_prach=R*Ts. To allow a BS to perform FFT with a sampling rate Ts, R may be a value consisting of a multiplier of 2 or a product of 2, 3, and 5.

More specifically, if R is defined as the multiplier of 2, a subcarrier spacing of the proposed RAP may be expressed by delta_SC_prach=delta_SC*r, where r is a natural number or a reciprocal of the natural number.

The table below shows a transmission bandwidth W_prach0 of a RAP format 0 and a transmission bandwidth W_prach4 of a RAP format 4 according to r.

TABLE 2

| r | W_prach0 (MHz) | W_prach4 (MHz) | T_prach (us) |
| --- | --- | --- | --- |
| 9 | 113.3 | 18.8 | 7.4 |
| 8 | 100.7 | 16.7 (6) | 8.3 |
| 7 | 88.1 | 14.6 | 9.5 |
| 6 | 75.7 | 12.5 | 11.1 |
| 5 | 62.9 | 10.4 | 13.3 |
| 4 | 50.3 | 8.3 (5) | 16.7 |
| 3 | 37.8 | 6.3 | 22.2 |
| 2 | 25.2 | 4.2 (4) | 33.3 |
| 1 | 12.6 | 2.1 | 66.6 |
| ½ | 6.3 | 1.0 (3) | 133.2 |
| ⅓ | 4.2 (2) | 0.7 | 199.8 |
| ¼ | 3.1 | 0.5 | 266.4 |
| 1/12 | 1.0 (1) | 0.2 | 799.2 |

In the table above, (1) and (3) respectively represent the existing RAP format 0 and RAP format 4. (2) and (4) show that a RAP having a bandwidth of 4 MHz which occupies at least about 80% of a bandwidth of 5 MHz can be generated when applying r=⅓ to the RAP format 0 or applying r2 to the RAP format 4. (5) and (6) show that a RAP having a band which occupies at least about 80% of a nominal bandwidth of 10 MHz or 20 MHz can be generated when applying r=4 or r=8 to the RAP format 4.

A RAP length is decreased as a subcarrier spacing is increased. For example, assume that the existing RAP format 4 is designated to have a symbol length of 133 us and satisfy cell coverage of about 14 km. If a subcarrier spacing of the RAP format 0 is increased to 5 kHz(=15 kHz*¼) as in (2), a symbol length becomes about 199 us, and cell coverage of about 14 km can be satisfied. However, when a subcarrier spacing of the RAP format 4 is increased to 30 kHz (in case of (4)), 60 kHz (in case of (5)), and 120 kHz (in case of (6)), symbol lengths are excessively shortened respectively to 33.3 us, 16.7 us, and 8.3 us, thereby possibly not being able to support sufficient cell coverage. Therefore, cell coverage may be increased by repeatedly transmitting the RAP in a time domain while increasing the subcarrier spacing.

Figure 4:
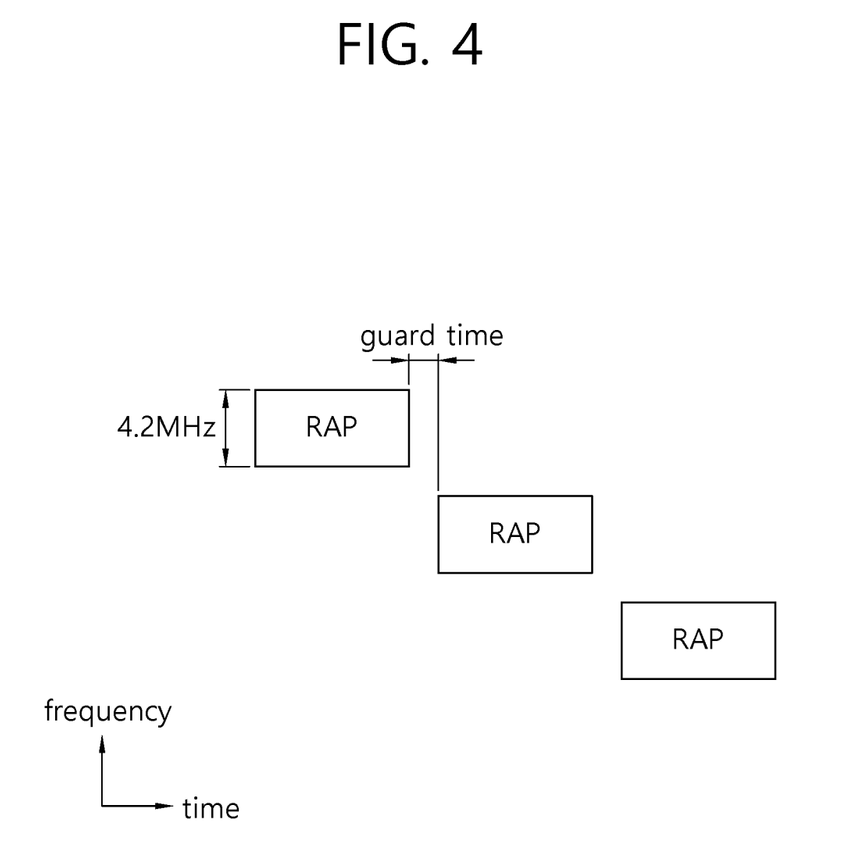
FIG. 4 shows an example of RAP transmission according to an embodiment of the present invention.

FIG. 4 shows an example of RAP transmission according to an embodiment of the present invention.

It is an example of repeatedly transmitting a RAP with a bandwidth of 4.2 MHz, generated based on (2) or (4) of Table 2, in a time domain.

Each RAP may be transmitted in the same frequency domain.

The RAP may be transmitted repeatedly according to a specific frequency pattern to increase a bandwidth occupied by the RAP. A center frequency of each repeated RAP may be hopped in the frequency domain while repeatedly transmitting the RAP in the time domain. The frequency hopping may be applied to a RAP format 0 having a short symbol duration.

A guard time may be defined between the RAPs. This is to facilitate implementation of RAP transmission in each frequency hopping unit. The guard time may be defined as at least 0, and may vary depending on a length of the RAP.

Figure 5:
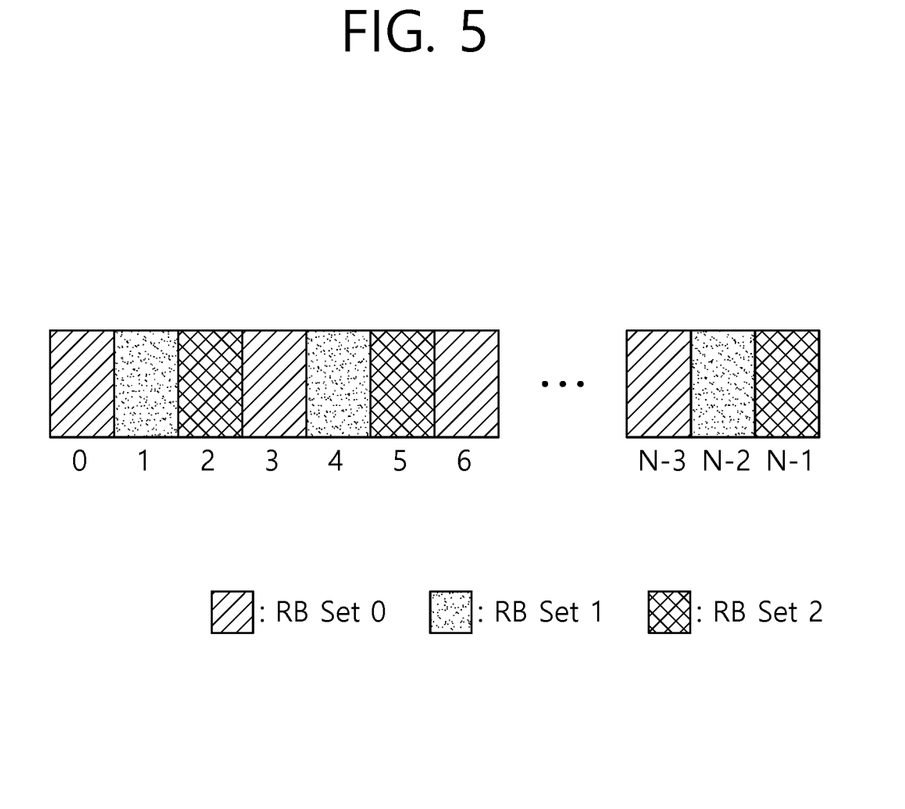
FIG. 5 shows an example of resource allocation for a RAP.

FIG. 5 shows an example of resource allocation for a RAP.

A resource block (RB) is a basic allocation unit having one or more subcarriers. When N RBs are defined in a full bandwidth, the RBs are divided into M RB sets. Herein, for example, M=3. An RB set 0 includes RBs having indices 0, 3, . . . , N−3. An RB set 1 includes RBs having indices 1, 4, . . . , N−2.

Basically, the RB set may be a unit of allocating a PUSCH. When the RB set is also used in RAP transmission, an RB set which cannot be used in PUSCH transmission due to RAP transmission needs to be minimized in design.

The RAP may be transmitted on a plurality of RBs belonging to one or more RB sets. The RAP may be distributed in a wider band by being interlaced in a frequency domain.

In a first embodiment, a RAP sequence in one OFDM symbol may be mapped to one or more RBs belonging to one RB set. The RAP sequence may be mapped to a subcarrier belonging to Q (Q>1) RBs in one RB set. For example, assume that one RB includes 12 subcarriers, a RAP sequence includes 139 symbols, and one RB set includes 20 RBs. The RAP sequence is mapped to 139 subcarriers among 20×12=240 subcarriers corresponding to one RB set in one OFDM symbol.

In a second embodiment, across a plurality of OFDM symbols, a RAP sequence may be mapped to one RB belonging to one RB set, and may be mapped repeatedly in the remaining RBs. For example, assume that one RB includes 12 subcarriers, a RAP sequence includes 139 symbols, and one RB set includes 20 RBs. The RAP sequence is mapped to 139 subcarriers among 12×12=144 subcarriers across 12 OFDM symbols in one RB in an RB set. In addition, the RAP sequence may be mapped repeatedly to one or more RBs selected among the remaining 19 RBs in the RB set.

In the conventional 3GPP LTE, the RAP is transmitted on consecutive 6 RBs. Regarding the proposed RAP, a RAP defined in the conventional LTE or a RAP configured with other limited frequency bands may be transmitted repeatedly in the frequency domain. The repeated RAP may use the same RAP sequence or different RAP sequences. The RAP sequence is a sequence used in RAP transmission. A combination of RAP sequences simultaneously transmitted by a UE may change based on a determined rule according to transmission timing. A BS may use a PDCCH order to report information on a first RAP sequence or a combination thereof.

L (L>=1) starting subcarriers and K (K>=1) ending subcarriers in each RB may be defined as a guard band.

A radio resource for RAP transmission may be defined based on at least any one of an RB set index, a starting RB index in an RB set, and an RB interval in the RB set. Information on this transmission resource may be given to the UE through a PDCCH order or an RRC message.

When the RAP is transmitted on a plurality of RBs belonging to one RB set, a RAP sequence may be allocated to an RB as follows.

In case of RAP format 0:
When 839 subcarriers having a subcarrier spacing of 1.25 kHz are separated in unit of 1 RB, a guard band of about 15 kHz is provided at both ends of each 1 RB.
When 9 RBs are used for the remaining 39 subcarriers, 93 subcarriers or 94 subcarriers are deployed for each RB. When 8 RBs are used, 104 subcarriers or 105 subcarriers are deployed.

In case of RAP format 4:
When 139 subcarriers having a subcarrier spacing of 7.5 kHz are separated in unit of 1 RB, a guard band of about 15 kHz exists at both ends of each 1 RB.
When 7 RBs are used for the remaining 39 subcarriers, 19 subcarriers or 20 subcarriers are deployed for each RB.

A maximum PSD limitation may be effective only for some regions and frequency bands. Therefore, the BS may activate/deactivate whether to allocate an RB set for RAP transmission and/or to perform transmission repeatedly in a time/frequency domain. This activation order may be given through a PDCCH order or an RRC message.

When a system bandwidth is increased, a transmission bandwidth of the RAP may be increased. The greater the system bandwidth, the greater the transmission bandwidth of the RAP to be transmitted.

A processing method is proposed when transmission of a UL channel (PUSCH or PUCCH) is scheduled in a subframe in which RAP transmission is possible (this is called a RAP subframe). The UL channel may not be transmitted in an RB (or an RB set) when an RB in which RAP transmission is configured overlaps. Alternatively, when the UL channel is scheduled in an RB in which RAP transmission is configured, transmission of the UL channel may be abandoned.

In order to reduce IFFT complexity for PUSCH reception, the number of RBs for PUSCH transmission preferably has a value having only 2, 3, and 5 as its factor. Therefore, if the number of RBs for PUSCH transmission is not the product of 2, 3, and 5 except for an RB in which RAP transmission is configured, some RBs may be further excluded so that the number of RBs is the product of 2, 3, and 5.

Even if PUSCH transmission is scheduled in a RAP subframe, the UE may ignore corresponding scheduling or may transmit a scheduled PUSCH in a subframe which comes after the RAP subframe. If PUSCH transmission is scheduled across a plurality of subframes, the UE may transmit the PUSCH only in a subframe except for the RAP subframe among the plurality of subframes. Alternatively, if the plurality of subframes are scheduled by one DCI, the UE may transmit the PUSCH by interpreting that the BS has scheduled subframes except for the RAP subframes.

Figure 6:
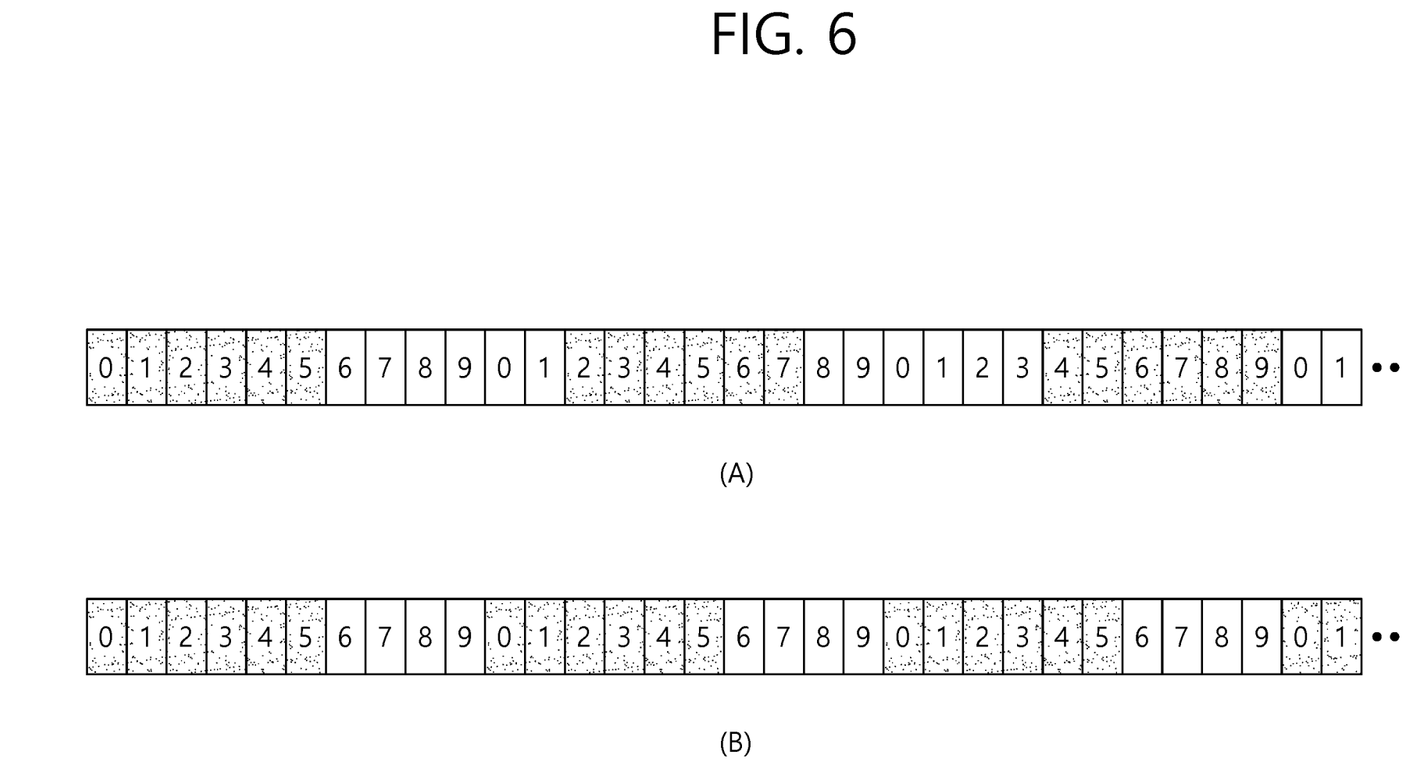
FIG. 6 shows an example of radio resource allocation for RAP transmission.

FIG. 6 shows an example of radio resource allocation for RAP transmission. A box indicates an RB, and a number inside the box indicates an RB index in an RB set. A hatched box indicates a unit RB block for RAP transmission.

Although it is shown that the RB set includes 10 RBs having indices from 0 to 9 and the unit RB block used in RAP transmission includes consecutive 6 RBs in the RB set, this is for exemplary purposes only.

A sub-figure (A) of FIG. 6 shows a format in which a unit RB block is repeated with a specific interval (herein, 6 RBs). However, since RBs in the RB set occupied by each unit RB vary, resource allocation for a UL channel may be inefficient.

According to a sub-figure (B) of FIG. 6 based on the proposed embodiment, a first RB in each unit RB block starts from an RB having the same index in the RB set. A plurality of unit RB blocks repeated in a frequency domain may be allowed to occupy RBs in the same RB set as much as possible to facilitate UL channel allocation. An interval between first RBs in the unit RB blocks (this is called a unit RB block interval) may be equal to the number of RBs existing in a system band or may be an integer multiple of that number. The unit RB block interval may be given through RRC signaling or a UL grant.

A plurality of RAP resources may be configured in a 3GPP LTE TDD system so that different UEs can transmit a RAP in a frequency domain. Specifically, a location of each RAP resource in a frequency domain may be defined by the following equation.

$$n_{PRB}^{RA} = \begin{cases} n_{PRB\,offset}^{RA} + 6\left\lfloor \frac{f_{RA}}{2} \right\rfloor, & \text{if } f_{RA} \bmod 2 = 0 \\ N_{RB}^{UL} - 6 - n_{PRB\,offset}^{RA} - 6\left\lfloor \frac{f_{RA}}{2} \right\rfloor, & \text{otherwise} \end{cases} \quad \text{[Equation 1]}$$

Herein, $n^{RA}_{PRB}$ denotes an RB index at which each RAP resource starts, $n^{RA}_{PRB\,Offset}$ denotes a configurable RB offset value, $f_{RA}$ denotes a RAP resource number as an integer greater than or equal to 0, and $N^{UL}_{RB}$ denotes the total number of RBs in a system. If $f_{RA}$ is 0 or an even number, a RAP resource is allocated by applying $n^{RA}_{PRB\,Offset}$ in a direction of increasing an RB index from a low-frequency-side RB. If $f_{RA}$ is an odd number, the RAP resource is allocated by applying $n^{RA}_{PRB\,Offset}$ in a direction of decreasing the RB index from a high-frequency-side RB.

The RAP resource allocation method may be similarly applied to a plurality of RAPs transmitted by one UE by using different frequency resources at the same time. In particular, PRACH resource allocation in a frequency domain may be implemented as follows so that a plurality of RAP resources occupy the same PUSCH interlace resource as in the aforementioned embodiments. Hereinafter, it is assumed that one RAP resource represents the existing RAP resource, and the UE transmits a plurality of PRACH resources at one time.

In a first embodiment, a high-frequency-side offset may be set independently from a low-frequency-side offset.

$$n_{PRB}^{RA} = \quad \text{[Equation 2]}$$

-continued
$$\begin{cases} n_{PRB\,offset,start}^{RA} + K\left\lfloor \frac{f_{RA}}{2} \right\rfloor, & \text{if } f_{RA} \bmod 2 = 0 \\ N_{RB}^{UL} - B_{RA} - n_{PRB\,offset,end}^{RA} - K\left\lfloor \frac{f_{RA}}{2} \right\rfloor, & \text{otherwise} \end{cases}$$

Herein, $n^{RA}_{PRB\,Offset,start}$ denotes an offset to be applied to a RAP resource position starting at a low-frequency side (or a lowest RB index), and $n^{RA}_{PRB\,Offset,end}$ denotes an offset to be applied to a PRACH resource position starting at a high-frequency side (or a greatest RB index). The two offsets may be set independently. $B_{RA}$ denotes the number of RBs occupied by each RAP resource, and may be omitted depending on a definition of the offset value. A network may set a proper high-frequency-side offset so that a RAP resource allocated in the high-frequency side occupies the same PUSCH interface.

In a second embodiment, a low-frequency-side offset may be used to set a RAP resource starting point of a high-frequency side so as to belong to the same PUSCH interlace as a RAP resource starting point of a low-frequency side.

$$n_{PRB}^{RA} = \quad \text{[Equation 3]}$$

$$\begin{cases} n_{PRB\,offset}^{RA} + K\left\lfloor \frac{f_{RA}}{2} \right\rfloor, & \text{if } f_{RA} \bmod 2 = 0 \\ N_{RB}^{UL} + (n_{PRB\,offset}^{RA} \bmod K) - K\left(\left\lfloor \frac{f_{RA}}{2} \right\rfloor + \left\lfloor \frac{n_{PRB\,offset}^{RA}}{K} \right\rfloor + 1 + \left\lfloor \frac{B_{RA}}{\{K - (n_{PRB\,offset}^{RA} \bmod K)\}} \right\rfloor \right) - X, & \text{otherwise} \end{cases}$$

In Equation 3 above, the number of RBs to be used in a high-frequency side may not be greater than or equal to the number of RBs of a low-frequency-side offset, which may be shown by the following equation.

$$n_{PRB}^{RA} = \quad \text{[Equation 4]}$$

$$\begin{cases} n_{PRB\,offset}^{RA} + K\left\lfloor \frac{f_{RA}}{2} \right\rfloor, & \text{if } f_{RA} \bmod 2 = 0 \\ N_{RB}^{UL} + (n_{PRB\,offset}^{RA} \bmod K) - K\left(\left\lfloor \frac{f_{RA}}{2} \right\rfloor + \left\lfloor \frac{n_{PRB\,offset}^{RA}}{K} \right\rfloor + 1 + \left\lfloor \frac{B_{RA} + (n_{PRB\,offset}^{RA} \bmod K) - X - 1}{\{K - (n_{PRB\,offset}^{RA} \bmod K) + X\}} \right\rfloor \right) - X, & \text{otherwise} \end{cases}$$

Herein, X is any offset. X may be an offset applied when a system bandwidth is not a multiple of K, and may be expressed by $X = N^{UL}_{RB} \bmod K$.

Alternatively, the following equation may be applied.

$$n_{PRB}^{RA} = \quad \text{[Equation 5]}$$

-continued $$\left\{\begin{array}{ll} n_{PRB\,offset}^{RA} + K\left\lfloor\frac{f_{RA}}{2}\right\rfloor, & \text{if } f_{RA} \bmod 2 = 0 \\ K\left\{\left\lceil\frac{N_{RB}^{UL} - B_{RA} - (n_{PRB\,offset}^{RA} \bmod K)}{K}\right\rceil - \right. & \text{otherwise} \\ \left.\left\lfloor\frac{f_{RA}}{2}\right\rfloor - \left\lfloor\frac{n_{PRB\,offset}^{RA}}{K}\right\rfloor\right\} + \\ (n_{PRB\,offset}^{RA} \bmod K), \end{array}\right.$$

In a third embodiment, a RAP resource may be deployed only based on a low-frequency-side offset or a high-frequency-side offset.

$$n_{PRB}^{RA} = n_{PRBoffset,start}^{RA} + K \cdot f_{RA} \qquad \text{[Equation 6]}$$

As shown in Equation 6 above, the RAP resource may be deployed with an equal interval by starting only based on a low-frequency-side offset. On the contrary, the RAP resource may be deployed with an equal interval only based on a high-frequency-side offset.

In the above methods, K may be an RB interval in one PUSCH interlace or may be an integer multiple of the RB interval. K may be pre-defined, or may be selected among a plurality of candidate values.

Now, a RAP waveform is described.

If the same RAP sequence is repeatedly transmitted in a frequency domain, the same waveform is repeated with an equal interval in the frequency domain, which may result in deterioration in a peak-to-average power ratio (PAPR) characteristic or a timing resolution characteristic in a time domain. Therefore, the present invention proposes to define a RAP sequence repeated by one UE in the frequency domain on the basis of a specific offset Δ. For example, assume that the UE has 64 RAP candidate sequences and an index is in the range of 0 to 63. The UE transmits a RAP sequence having an index i at a lowest frequency. The UE may sequentially transmit RAP sequences having indices i+Δ, i+2Δ, and i+3Δ in an ascending order of frequency. For example, Δ may be set to 1 or 2.

The RAP sequence may be selected randomly to prevent a regular correlation characteristic from being exhibited between RAP waveforms for a plurality of RAP sequences or to prevent a bad PAPR characteristic from being regarded as if it is constant for many RAP waveforms. For example, if i(k) is an index of a $k^{th}$ RAP sequence, an index of a $(k+1)^{th}$ RAP sequence may be determined as $i(k+1)=i(k)+\Delta r$. $\Delta_r$ is a randomly determined value, and may be determined based on at least one of k, k+1, a subframe number, a cell identifier, and a UE identifier.

Meanwhile, in 3GPP LTE, the RAP sequence may be defined by a Zadoff-Chu (ZC) sequence as follows.

$$x_u(n) = e^{-j\frac{\pi u n(n+1)}{N_{ZC}}}, 0 \le n \le N_{ZC} - 1 \qquad \text{[Equation 7]}$$

Herein, $N_{ZC}$ is a length of the RAP sequence. $N_{ZC}$=839 for the RAP formats 0 to 3, and $N_{ZC}$=139 for the RAP format 4. u is a physical root index. The UE generates 64 RAP candidate sequences in each cell. The number of RAP candidate sequences to be generated is equal to the number of cyclic shifts (CSs) that can be used based on a physical root index allocated for each cell. If the number of RAP candidate sequences obtained based on the physical root index is less than 63, the RAP candidate sequence is continuously generated based on a physical root index corresponding to a next logical root index. The logical root index is a logical index which is 1:1 mapped to the physical root index.

For convenience, it is defined that Nprach is the number of RAP sequences allocated to any cell, and Ncs(u) is the number of CSs that can be used in a physical root index. Nrep is the number of RAPs to be repeatedly transmitted, and i(k) is an index of a $k^{th}$ RAP sequence which constitutes one RAP waveforms. Herein, k=1, 2, . . . , Nrep.

To define the RAP waveform, the following methods are proposed:

In a first embodiment, a plurality of RAP sequences constituting one RAP waveform may be selected from RAP candidate sequences assigned to a corresponding cell. For example, the RAP sequence to be repeatedly transmitted may be selected from 64 RAP candidate sequences.

In a second embodiment, a plurality of RAP sequences constituting one RAP waveform may be selected from RAP candidate sequences generated from one physical root index.

In a third embodiment, a plurality of RAP sequences constituting one RAP waveform may be selected from RAP candidate sequences generated from a plurality of physical root indices. A RAP sequence having an index i(k+1) may be selected from RAP candidate sequences generated from a physical root index different from a physical root index corresponding to a RAP sequence having an index i(k).

Although it is described in the aforementioned embodiment that a plurality of RAP sequences constituting one PRACH waveform are RAP sequences to be mapped to a lowest frequency, the same technique is also applicable based on a RAP sequence to be mapped to a different frequency value (e.g., a center frequency or a highest frequency).

Now, transmission timing adjustment for RAP transmission is proposed.

In 3GPP LTE, transmission of a UL channel (PUSCH, PUCCH, SRS, etc.) compensates both a DL transmission delay from a BS to a UE and a UL transmission delay from the UE to the BS. Timing advance (TA) control is performed so that transmission of UL channels, performed by a plurality of UEs, arrives at the same time. In doing so, a transmission time (specifically, a UL subframe boundary at which UL transmission starts) is advanced by a TA value. On the other hand, a RAP transmitted to check a time alignment status in a state where a UL time alignment is uncertain is transmitted based on a reception time (specifically, a DL subframe boundary) of each UE from the BS without the TA control.

Figure 7:
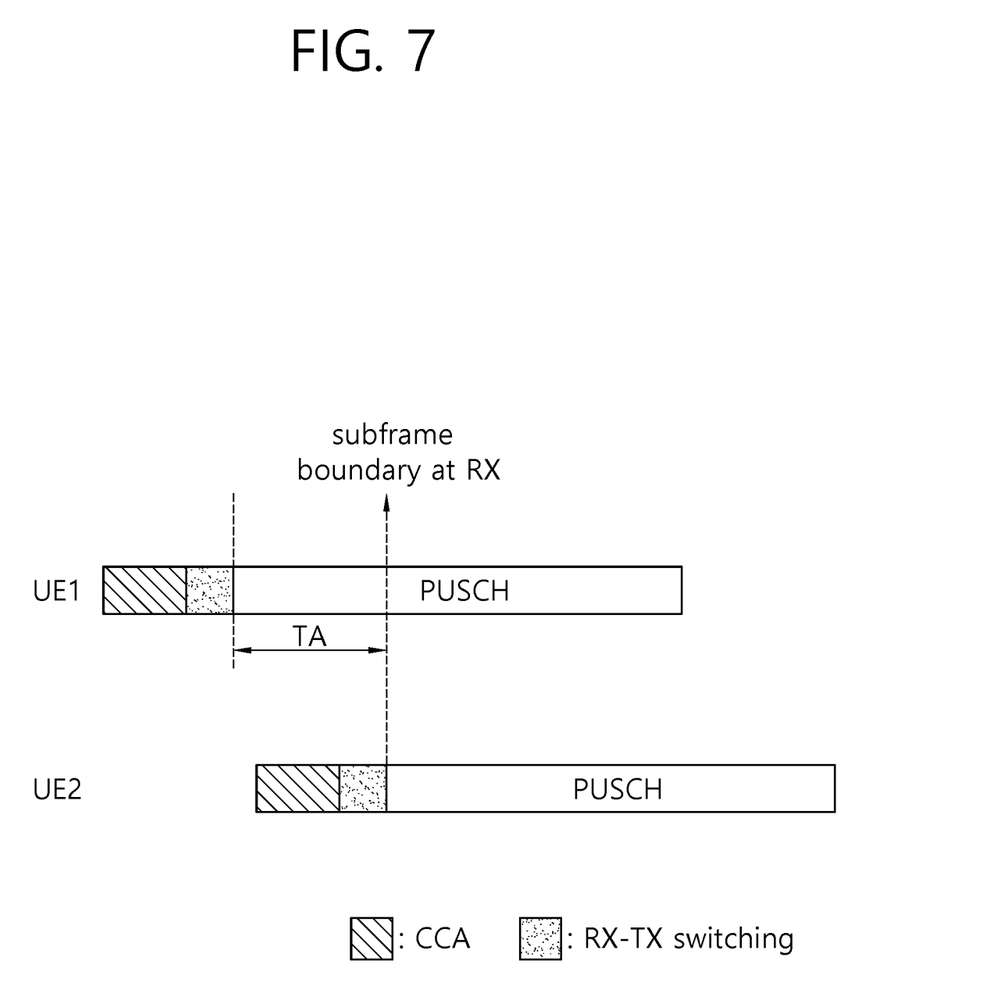
FIG. 7 shows a problem caused by transmission timing adjustment.

FIG. 7 shows a problem caused by transmission timing adjustment.

Assume that a UE1 and a UE2 have the same sub-frame boundary reception time. The UE1 transmits a PUSCH to which TA is applied, whereas the UE2 attempts to transmit a RAP to which the TA is not applied. When the UE2 performs CCA before RAP transmission in an unlicensed band, RAP transmission may be abandoned due to PUSCH transmission performed by the UE1.

Figure 8:
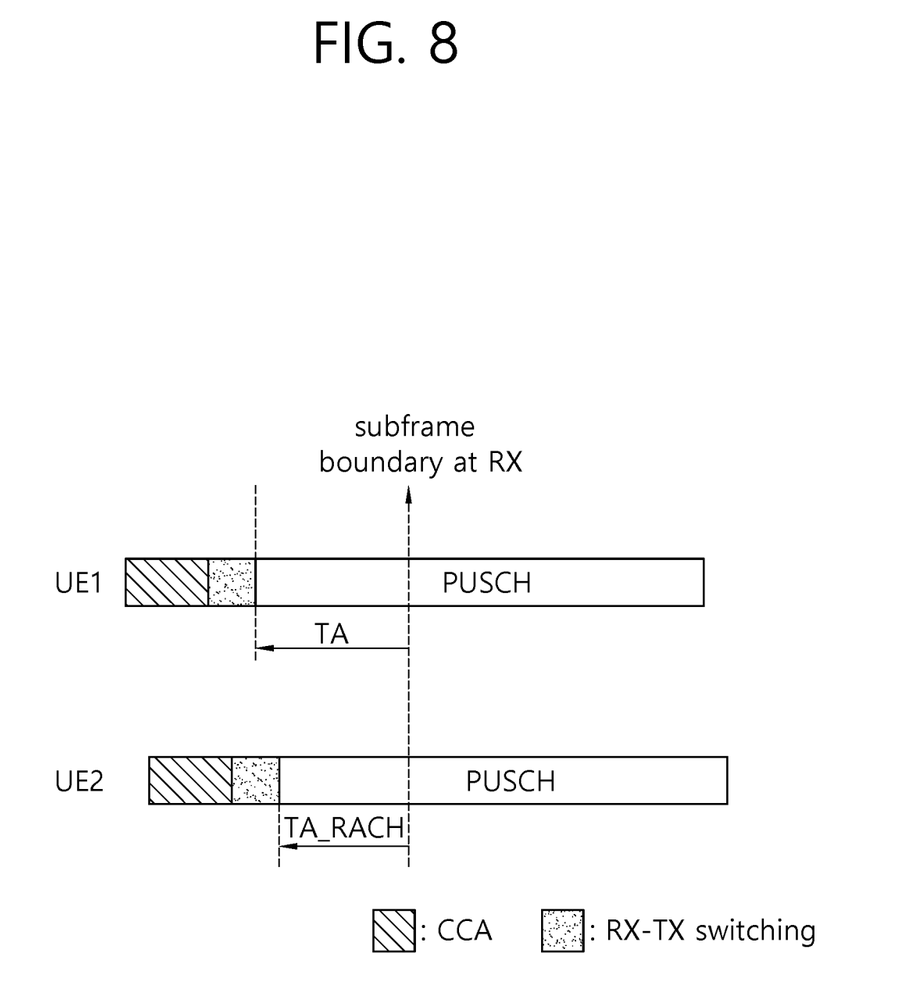
FIG. 8 shows the proposed transmission timing adjustment.

FIG. 8 shows the proposed transmission timing adjustment.

To prevent RAP transmission from being abandoned, it is proposed to apply TA in the RAP transmission. TA_RACH is a TA value assigned to the RAP transmission. When TA_TACH is applied to the PRACH transmission, even if CCA is performed, PUSCH transmission of a UE1 is not detected, and thus a UE2 can successfully transmit the RAP.

However, if a cell radius is great, TA values applied to different UEs may be significantly different. For example, the TA to be applied may be in the range of about 0 to 12 us according to a location of the UE in a cell radius of 2 km. A method of applying a fixed TA value to RAP transmission may have difficulty in preventing RAP transmission from being abandoned due to UL channel transmission having various TA values.

Scheduling information for scheduling or triggering transmission of a UL channel may include TA information regarding TA to be applied to transmission of a corresponding UL channel. The TA information may include at least one of the followings.

(1) Whether to apply a TA value
(2) A TA value (absolute value or offset) to be applied to corresponding UL channel transmission
(3) Indication of one value selected from a plurality of TA candidate values
(4) Whether to apply a predetermined TA value (or a value obtained by adding an offset to the predetermined TA value) to transmission of a corresponding UL channel A RAP order for instructing RAP transmission may include TA information regarding TA to be applied to the RAP transmission. The TA information may include at least one of the followings.

Figure 9:
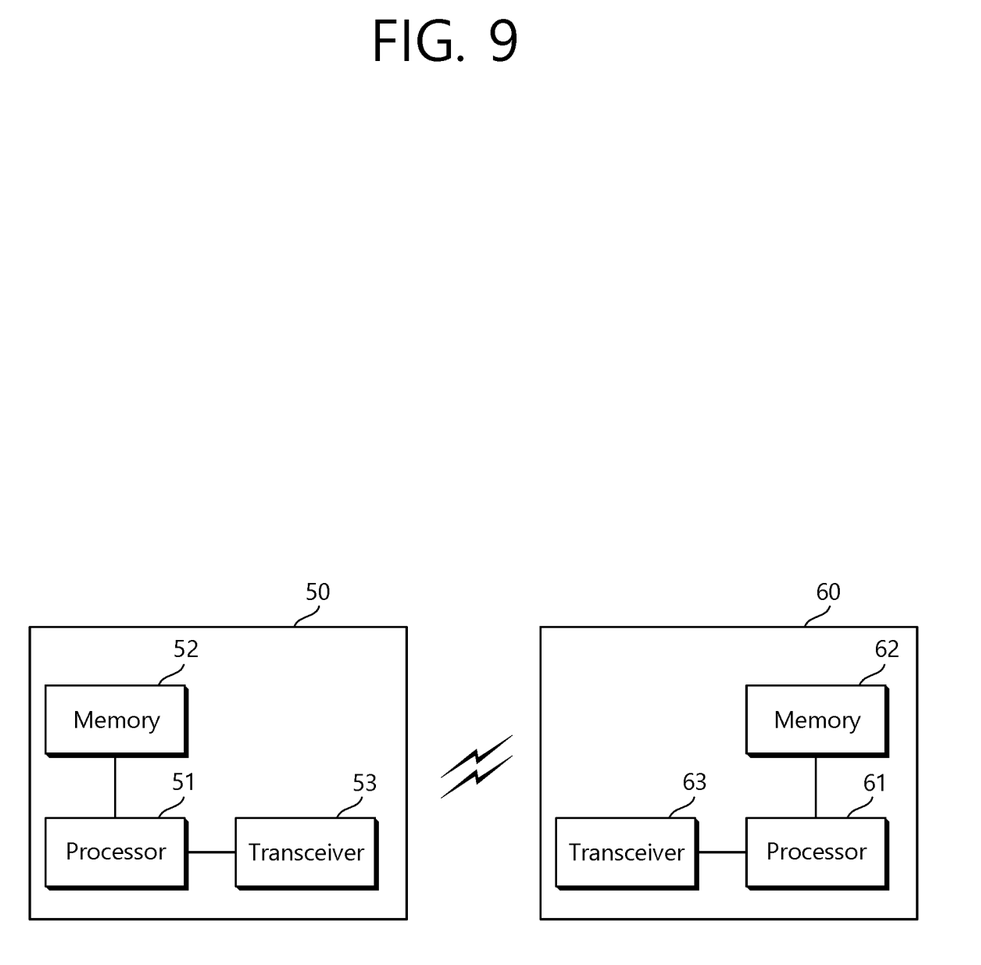
FIG. 9 is a block diagram showing a wireless communication system according to an embodiment of the present invention.

(1) Whether to apply a TA value
(2) A TA value (absolute value or offset) to be applied to corresponding UL channel transmission
(3) Indication of one value selected from a plurality of TA candidate values FIG. 9 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a random access procedure in an unlicensed band, the method comprising:
performing, by a wireless device, a clear channel assessment (CCA) during a random access preamble (RAP) window in the unlicensed band; and
transmitting, by the wireless device, a plurality of RAPs if the CCA is successful,
wherein the plurality of RAPs are repeatedly transmitted in a frequency domain or a time domain, and
wherein the plurality of RAPs include a first RAP transmitted in a first frequency band within the unlicensed band and a second RAP transmitted in a second frequency band within the unlicensed band, and the first RAP and the second RAP are transmitted at a same time point.

2. The method of claim 1, wherein a bandwidth at which the plurality of RAPs are transmitted occupies more than half of an entire bandwidth of the unlicensed band.

3. The method of claim 1, wherein the plurality of RAPs include a third RAP transmitted at a first time point within the unlicensed band and a fourth RAP transmitted at a second time point within the unlicensed band.

4. The method of claim 3, wherein the third RAP and the fourth RAP are transmitted in different frequency bands.

5. The method of claim 3, wherein a guard time is disposed between a last part of the third RAP and a start part of the fourth RAP.

6. The method of claim 1, wherein the plurality of RAPs include different RAP sequences.

7. The method of claim 1, further comprising
receiving, by the wireless device, a RAP order instructing a transmission of the plurality of RAPs,
wherein the RAP order includes information regarding a timing advance (TA) value to be applied to the transmission of the plurality of RAPs.

8. A device for performing a random access procedure in an unlicensed band, the device comprising:
a transceiver that transmits and receives a radio signal; and
a processor that:
performs a clear channel assessment (CCA) during a random access preamble (RAP) window in the unlicensed band; and
controls the transceiver to transmit a plurality of RAPs if the CCA is successful,
wherein the plurality of RAPs are repeatedly transmitted in a frequency domain or a time domain, and
wherein the plurality of RAPs include a first RAP transmitted in a first frequency band within the unlicensed band and a second RAP transmitted in a second frequency band within the unlicensed band, and the first RAP and the second RAP are transmitted at a same time point.

9. The device of claim 8, wherein a bandwidth at which the plurality of RAPs are transmitted occupies more than half of an entire bandwidth of the unlicensed band.

10. The device of claim 8, wherein the plurality of RAPs include a third RAP transmitted at a first time point within the unlicensed band and a fourth RAP transmitted at a second time point within the unlicensed band.

11. The device of claim 10, wherein the third RAP and the fourth RAP are transmitted in different frequency bands.

12. The device of claim 10, wherein a guard time is disposed between a last part of the third RAP and a start part of the fourth RAP.

\* \* \* \* \*